(12) United States Patent
Kadowaki

(10) Patent No.: US 11,466,751 B2
(45) Date of Patent: Oct. 11, 2022

(54) ANTI-VIBRATION DEVICE

(71) Applicant: YAMASHITA RUBBER CO., LTD., Fujimino (JP)

(72) Inventor: Hirokazu Kadowaki, Saitama (JP)

(73) Assignee: YAMASHITA RUBBER CO., LTD., Fujimino (JP)

( * ) Notice: Subject to any disclaimer, the term of this patent is extended or adjusted under 35 U.S.C. 154(b) by 709 days.

(21) Appl. No.: 16/330,547

(22) PCT Filed: Sep. 6, 2017

(86) PCT No.: PCT/JP2017/032042
§ 371 (c)(1),
(2) Date: Mar. 20, 2020

(87) PCT Pub. No.: WO2018/047845
PCT Pub. Date: Mar. 15, 2018

(65) Prior Publication Data
US 2020/0217391 A1 Jul. 9, 2020

(30) Foreign Application Priority Data
Sep. 6, 2016 (JP) .............................. JP2016-173905

(51) Int. Cl.
*F16F 13/10* (2006.01)
*B60K 5/12* (2006.01)

(52) U.S. Cl.
CPC ............ *F16F 13/10* (2013.01); *B60K 5/1208* (2013.01)

(58) Field of Classification Search
CPC .............. F16F 13/10; F16F 2230/0005; B60K 5/1208; B60K 5/12
(Continued)

(56) References Cited

U.S. PATENT DOCUMENTS 4,496,177 A * 1/1985 Pissot ...................... G12B 9/04
292/87
2003/0213884 A1 11/2003 Ikunami
(Continued)

FOREIGN PATENT DOCUMENTS

JP S58-8809 1/1983
JP 2001-263320 9/2001
(Continued)

*Primary Examiner* — Muhammad Ijaz
(74) *Attorney, Agent, or Firm* — Rankin, Hill & Clark LLP

(57) ABSTRACT

An anti-vibration device is provided with: an anti-vibration device body, in which an insulator is disposed between a first attachment member and a second attachment member; and a bracket, which has opposing wall portions and to which the anti-vibration device body is fixed by press-fitting via the second attachment member between the wall portions. The second attachment member is provided with interlocking portions that interlock with the wall portions and restrain the anti-vibration device body from moving in the direction opposite the press-fitting direction when the anti-vibration device body is press-fitted to the bracket. Each of the interlocking portions is configured so as to have an arm part extending in the direction opposite the press-fitting direction, and a hook part provided to the extension-direction end of the arm part and caused to interlock with a to-be-interlocked part of one of the wall portions.

15 Claims, 11 Drawing Sheets

(58) Field of Classification Search
USPC ........................................................ 248/562
See application file for complete search history.

(56) References Cited

U.S. PATENT DOCUMENTS

| | | | | |
|---|---|---|---|---|
| 2010/0264570 | A1* | 10/2010 | Thierry | F16F 13/103 |
| | | | | 267/141 |
| 2011/0031663 | A1* | 2/2011 | Matsuda | B60K 5/1208 |
| | | | | 267/140.13 |
| 2011/0094178 | A1* | 4/2011 | Braun | F16B 5/0056 |
| | | | | 52/745.21 |
| 2015/0041617 | A1* | 2/2015 | Okumura | F16F 1/3863 |
| | | | | 248/634 |
| 2015/0300445 | A1 | 10/2015 | Abe et al. | |
| 2016/0238102 | A1* | 8/2016 | Goto | F16F 13/103 |
| 2017/0207027 | A1 | 7/2017 | Sato et al. | |
| 2017/0305254 | A1* | 10/2017 | Kadowaki | F16F 15/08 |
| 2018/0023655 | A1* | 1/2018 | Komiya | F16F 13/10 |
| | | | | 267/140.13 |
| 2019/0113100 | A1* | 4/2019 | Shimada | B60K 5/1291 |
| 2019/0168595 | A1* | 6/2019 | Tanaka | F16F 13/103 |

FOREIGN PATENT DOCUMENTS

| | | |
|---|---|---|
| JP | 2003-333458 | 11/2003 |
| JP | 2010-528233 | 8/2010 |
| JP | 2010-255685 | 11/2010 |
| JP | 2013-108555 | 6/2013 |
| JP | 2013-239920 | 11/2013 |
| JP | 2015-206402 | 11/2015 |
| JP | 2016-053692 | 4/2016 |
| WO | 2016/027462 | 2/2016 |

\* cited by examiner

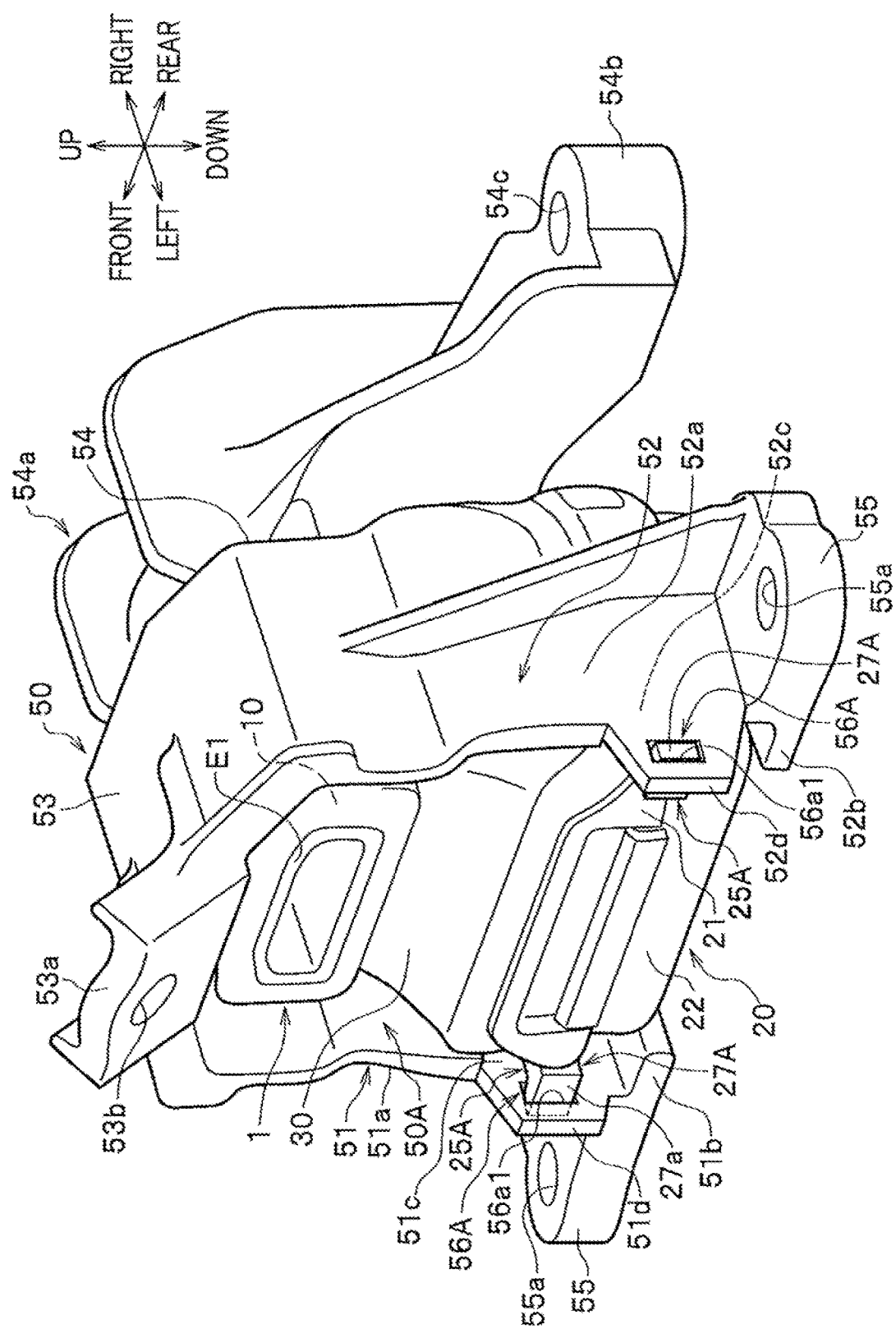

ANTI-VIBRATION DEVICE

TECHNICAL FIELD

The present invention relates to an anti-vibration device of an automobile.

BACKGROUND ART

As this kind of anti-vibration device in conventional art, an anti-vibration device disclosed in Patent Literature 1 is known. This anti-vibration device includes an anti-vibration device body including a first attachment member, a second attachment member, and an insulator elastically coupling the attachment members together. The anti-vibration device body is fixed to a bracket by press-fitting the second attachment member to the inside of the bracket.

Downsizing of the anti-vibration device has been requested along with downsizing of the engine room of an automobile. A typical anti-vibration device such as the anti-vibration device described in Patent Literature 1 has a circular outer shape in planar view, which is likely to lead to a decrease of space efficiency. To address this, as an anti-vibration device with space saving taken into account, there has been discussed an anti-vibration device including an anti-vibration device body having, for example, a substantially rectangular outer shape in planar view.

In this case, a bracket including facing wall parts and having an opening at least on one side is used. Then, two facing outside parts of the anti-vibration device body is press-fit into the space between the facing wall parts. In this way, an anti-vibration device in which the anti-vibration device body is fixed to the bracket is achieved.

CITATION LIST

Patent Literature

Patent Literature 1: Japanese Unexamined Patent Application Publication No. 2015-206402

SUMMARY OF INVENTION

Technical Problem

However, in the above-described case where the anti-vibration device body is fixed between the facing wall parts of the bracket by press-fitting, the direction in which the anti-vibration device body contacts the facing wall parts is different from the direction in which the anti-vibration device body may come off from the bracket. For this reason, movement of the anti-vibration device body relative to the bracket in the coming-off direction is difficult to restrict by way of the press-fitting alone, and it has been required to make improvements to the above structure.

The present invention has been made to solve the above problem and an object of the invention is to provide an anti-vibration device provided with a bracket including facing wall parts between which an anti-vibration device body is press-fitted, the anti-vibration device being capable of favorably preventing the anti-vibration device body from coming off the bracket.

Solution to Problem

In order to solve the above problem, an anti-vibration device according to the present invention includes: an anti-vibration device body in which an insulator is interposed between a first attachment member and a second attachment member; and a bracket including facing wall parts between which the anti-vibration device body is fixed by press-fitting via the second attachment member. The second attachment member is provided with locking parts that are locked to the wall parts to restrict movement of the anti-vibration device body in a direction opposite to a press-fitting direction in which the anti-vibration device body is press-fitted to the bracket. Each of the locking parts includes an arm part extending in the direction opposite to the press-fitting direction in which the anti-vibration device body is press-fitted to the bracket, and a hook part provided at an end part of the arm part in the direction in which the arm part extends and locked to a part to be locked provided on one of the wall parts.

In such an anti-vibration device, when the anti-vibration device body is press-fitted to the bracket via the second attachment member, the hook part of each locking part provided on the second attachment member is locked to the part to be locked provided on the corresponding wall part of the bracket, which completes the press-fitting. The arm part of the locking part extends in the direction opposite to the press-fitting direction in which the anti-vibration device body is press-fitted to the bracket, and the hook part is provided at the end part of the arm part in the direction in which the arm part extends. With this configuration, after locking, the arm part sluts against movement of the anti-vibration device body in the coming-off direction, in other words, movement thereof in the direction opposite to the press-fitting direction. Accordingly, the movement of the anti-vibration device body in the coming-off direction is directly restricted by the locking part, and disposition (fixation) of the anti-vibration device body onto the bracket is excellently maintained.

Moreover, in the above-described anti-vibration device, it is preferable that the part to be locked to which the hook part of each locking part is locked is a locking hole. With this configuration, the part to be locked can be easily formed.

Moreover, in the above-described anti-vibration device, it is preferable that the locking parts are formed integrally with the second attachment member when the second attachment member is made of resin. With this configuration, the locking part can be easily formed. In addition, the locking part can easily have elasticity, which leads to improvement of assembly easiness.

Moreover, in the above-described anti-vibration device, it is preferable that the second attachment member includes a frame member, and an outer tubular member fixed to the frame member, and the locking parts are provided on at least one of the frame member and the outer tubular member. With this configuration, the second attachment member is made of at least two members, and the locking parts are provided on one of the two members, and thus shaping easiness and assembly easiness can be improved.

Advantageous Effects of Invention

The present invention allows an anti-vibration device to be obtained, which is provided with a bracket including facing wall parts between which an anti-vibration device body is press-fitted, the anti-vibration device being capable of favorably preventing the anti-vibration device body from coming off the bracket.

BRIEF DESCRIPTION OF DRAWINGS

FIG. 8 is a perspective view illustrating an anti-vibration device according to a second embodiment of the present invention.

DESCRIPTION OF EMBODIMENTS

Embodiments of an anti-vibration device according to the present invention will be described below with reference to the accompanying drawings. In the following description, "front and back", "up and down", and "right and left" of the anti-vibration device are defined with reference to directions illustrated in FIG. 1. However, the "front and back" direction defined for the anti-vibration device does not necessarily coincide with the front-back direction of the vehicle body of an automobile. Vibration is input to the anti-vibration device mainly in the up-down direction.

In the embodiments below, description is made with an example in which the anti-vibration device is a liquid sealing anti-vibration device, but the example does not intend to limit the type of the anti-vibration device. For example, the present invention is applicable to a non-liquid sealing anti-vibration device. In the embodiments, any identical components are denoted by an identical reference sign, and duplicate description thereof will be omitted.

First Embodiment

Schematic Configuration of Anti-Vibration Device

Figure 1:
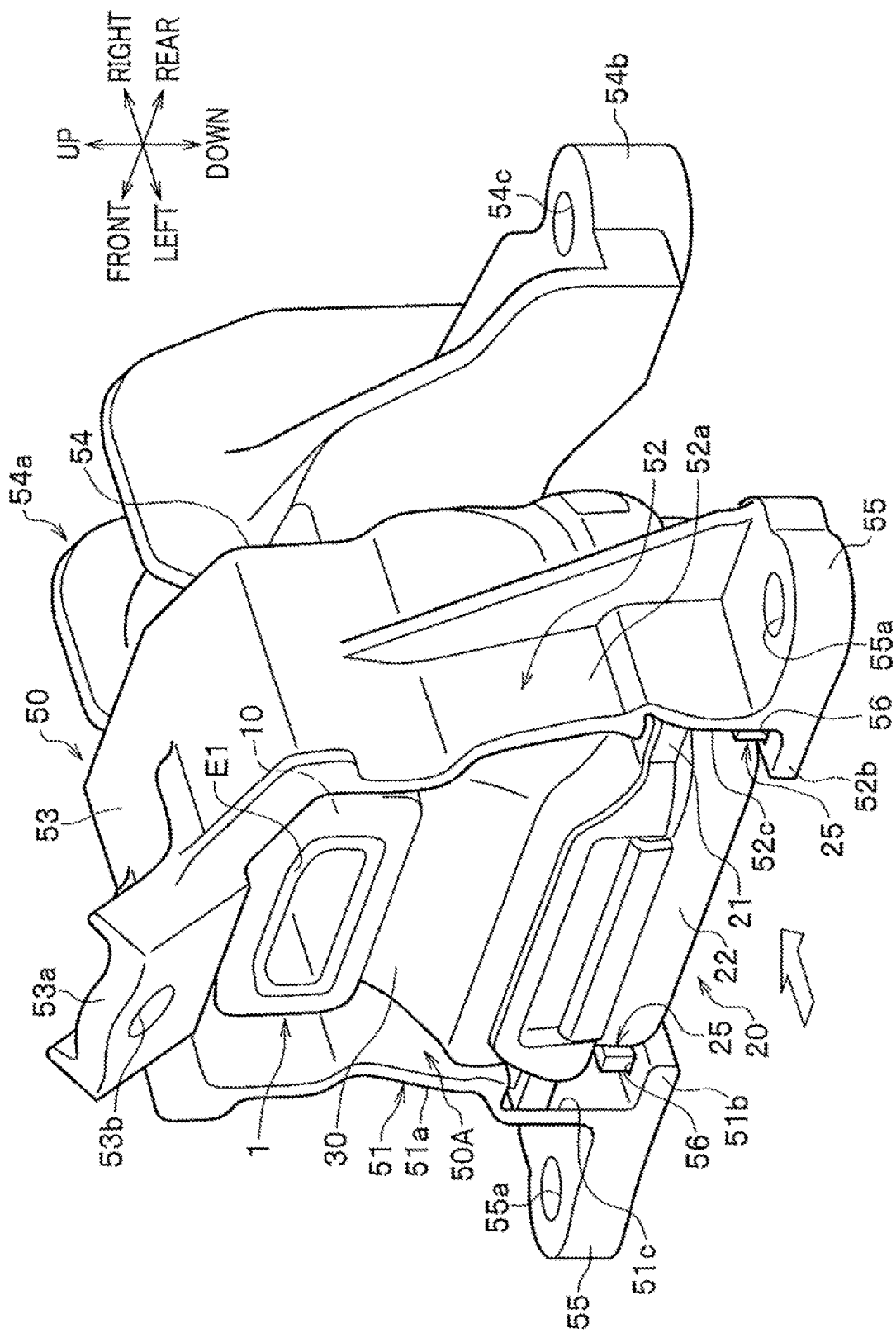
FIG. 1 is a perspective view illustrating an anti-vibration device according to a first embodiment of the present invention.
Figure 2:
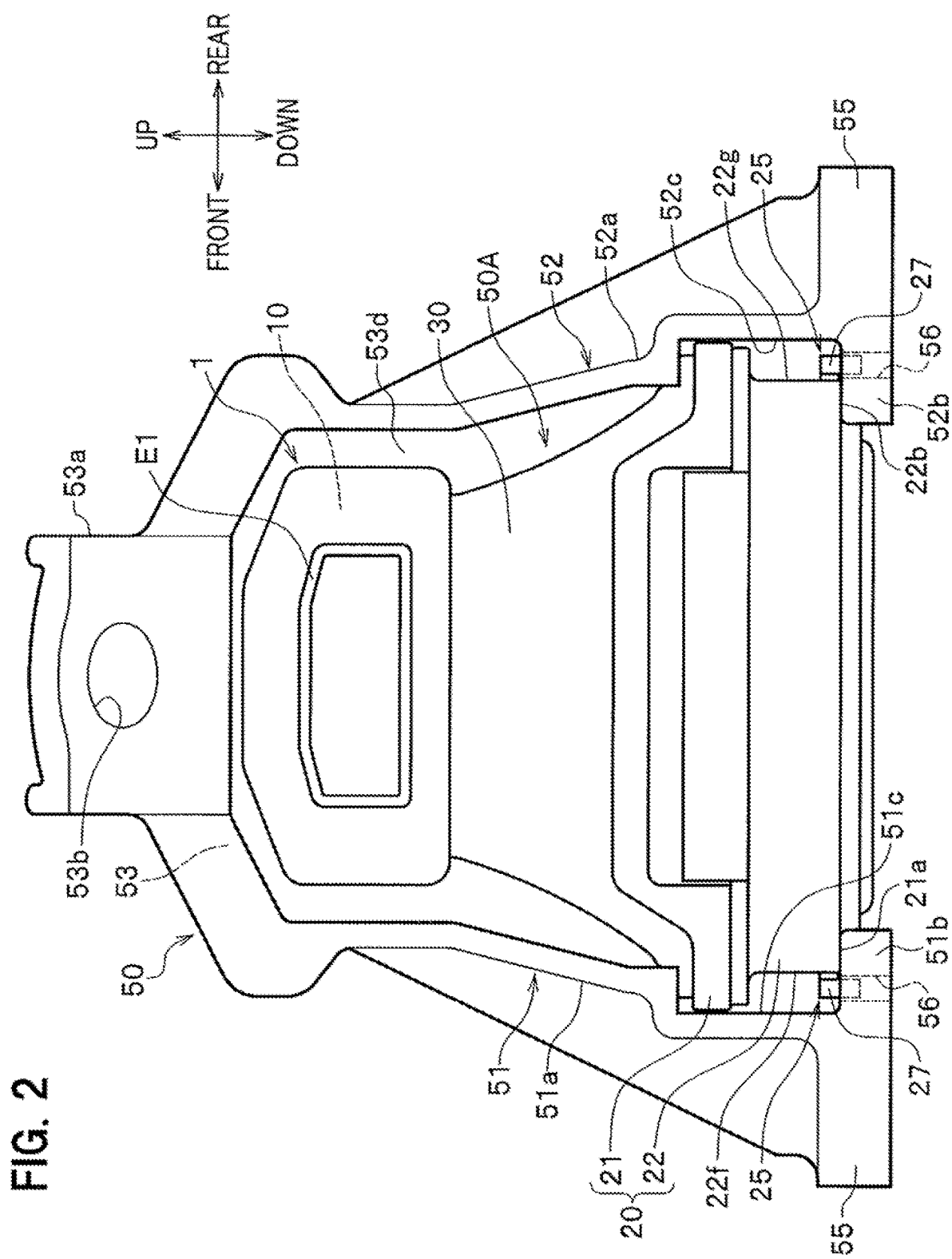
FIG. 2 is a left side view of FIG. 1.

As illustrated in FIGS. 1 and 2, the anti-vibration device includes an anti-vibration device body 1 having an anti-vibration function, and a bracket 50 to which the anti-vibration device body 1 is assembled.

Figure 4:
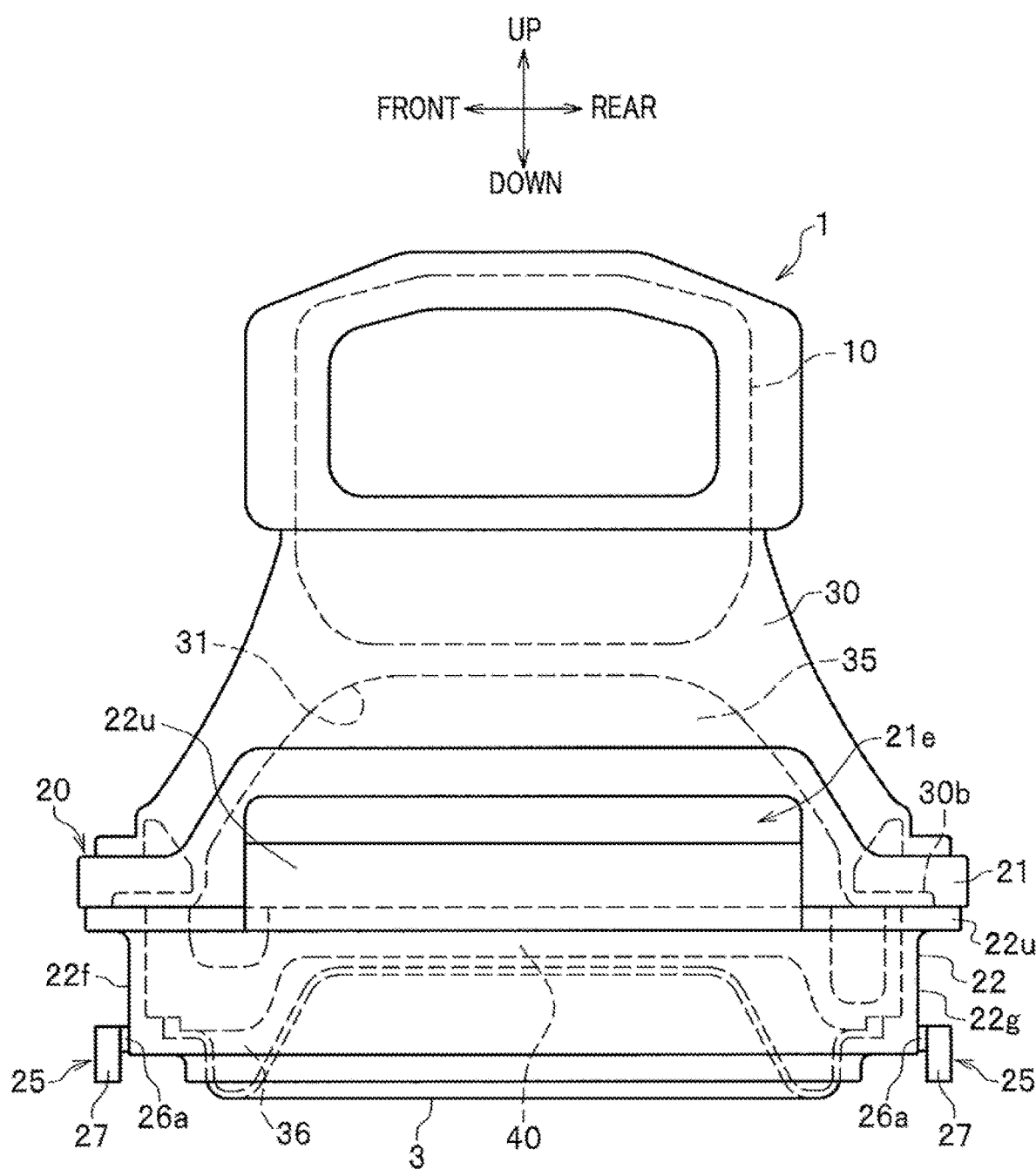
FIG. 4 is a left side view illustrating the anti-vibration device body.
Figure 5:
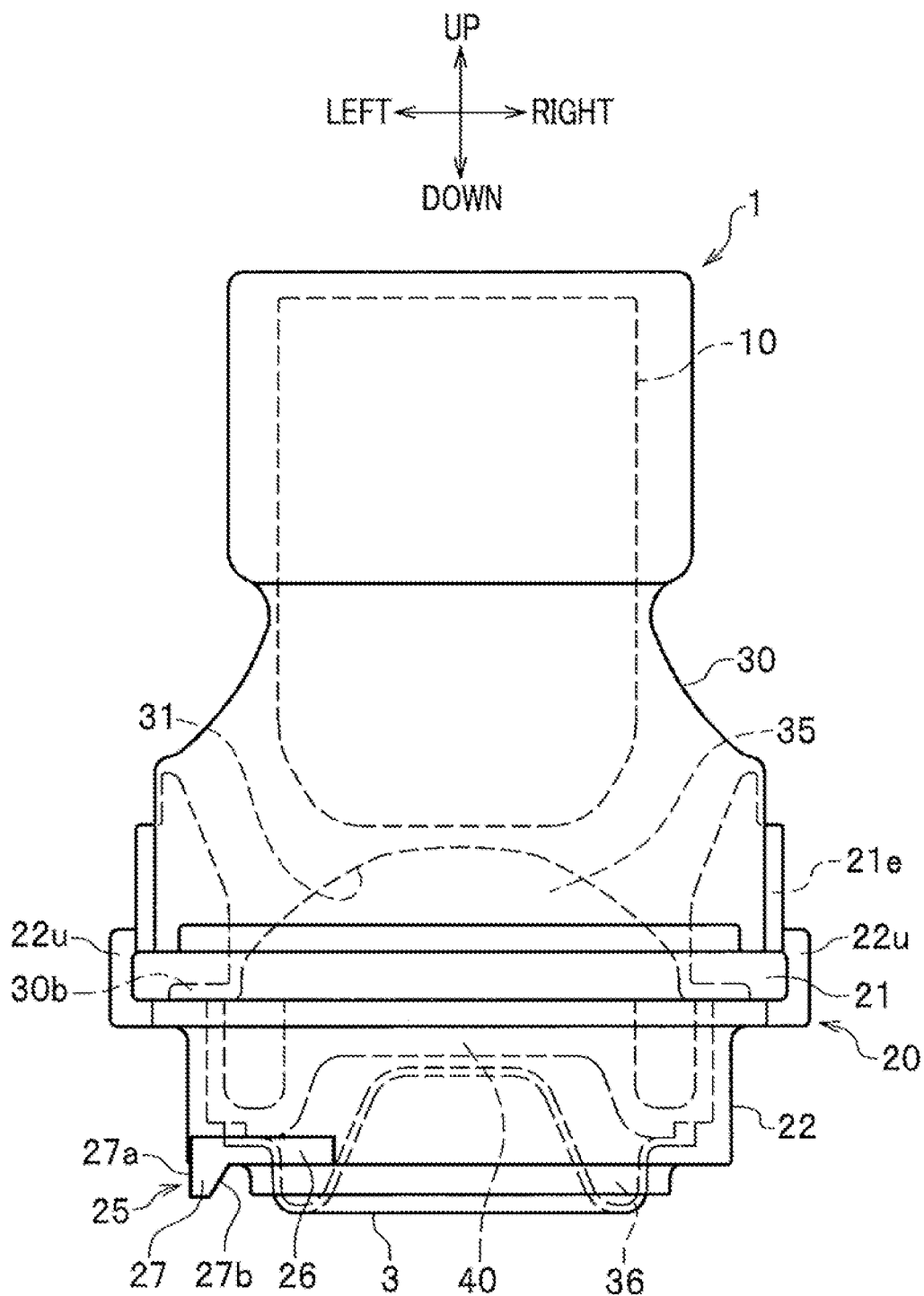
FIG. 5 is a back side view illustrating the anti-vibration device body.

As illustrated in FIGS. 4 and 5, in the anti-vibration device body 1, an insulator 30 is interposed between a first attachment member 10 and a second attachment member 20. As illustrated in FIGS. 1 and 2, the bracket 50 includes at least facing front and back wall parts 51 and 52 between which the anti-vibration device body 1 is fixed by press-fitting via the second attachment member 20 of the anti-vibration device body 1. The direction in which the anti-vibration device body 1 is press-fit to the bracket 50 is indicated by a white arrow in FIG. 1.

As illustrated in FIGS. 1 and 2, the second attachment member 20 of the anti-vibration device body 1 includes a pair of locking parts 25 locked to the front and back wall parts 51 and 52 of the bracket 50. As described later, the pair of locking parts 25 restrict movement of the anti-vibration device body 1 in a direction opposite to the press-fitting direction of the anti-vibration device body 1 (the direction of the white arrow in FIG. 1).

Although described later, flange-shaped bottom parts 51b and 52b are provided at lower end parts of the front and back wall parts 51 and 52 of the bracket 50, and provided with locking holes 56 as parts to be locked. The configuration of each component will be described below in detail.

Anti-Vibration Device Body

Figure 3:
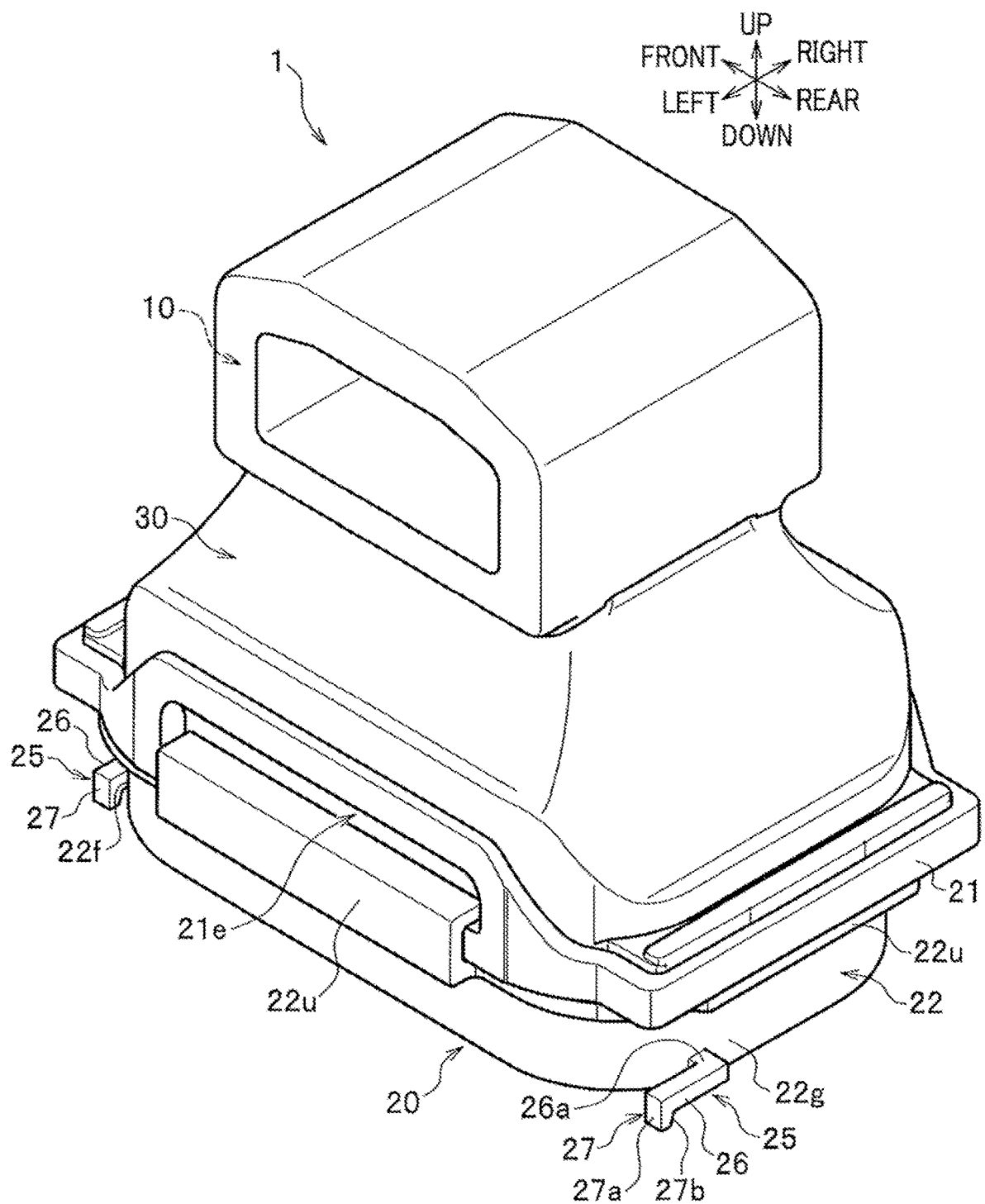
FIG. 3 is a perspective view illustrating an anti-vibration device body.

As illustrated in FIG. 3, the anti-vibration device body 1 has, in planar view, a substantially rectangular shape having a long side in the front-back direction and a short side in a right-left direction orthogonal to the front-back direction. As described above, the anti-vibration device body 1 includes the first attachment member 10, the second attachment member 20, and the insulator 30.

First Attachment Member

As illustrated in FIGS. 4 and 5, the first attachment member 10 is integrally provided above the insulator 30. The first attachment member 10 is made of, for example, aluminum alloy. The first attachment member 10 is substantially entirely buried in the insulator 30 and bonded to the insulator 30 through vulcanization. The first attachment member 10 may have a conventionally publicly known structure including, for example, an axial member and tubular member. A bracket E1 is fitted inside the tubular member (see FIGS. 1 and 2).

Insulator

The insulator 30 has a substantially truncated cone shape, and a recessed part 31 is formed inside insulator 30. The recessed part 31 forms a main liquid chamber 35 in which incompressible actuate liquid is encapsulated. The main liquid chamber 35 is partitioned from a sub liquid chamber 36 by a partition member 40 disposed below the insulator 30. The sub liquid chamber 36 includes a diaphragm 3 as part of a wall part.

The insulator 30 includes an extension part 30b disposed on a lower surface of a frame member 21 of the second attachment member 20 to be described later. The extension part 30b of the insulator 30 positions an outer peripheral end part of an upper surface of the partition member 40.

Second Attachment Member

The second attachment member 20 is fixed by press-fitting to a recessed part 51c of the front wall part 51 and a recessed part 52c of the back wall part 52 of the bracket 50 to be described later (see FIGS. 1 and 2). The second attachment member 20 is formed by combining two vertical components of the frame member 21 and an outer tubular member 22. In other words, the frame member 21 and the outer tubular member 22 are press-fitted to the bracket 50 while being combined with each other (see FIGS. 1 and 2). The frame member 21 and the outer tubular member 22 are each formed in a rectangular tube shape (see FIG. 3). The frame member 21 and the outer tubular member 22 are synthesis resin molded products (made of resin).

As illustrated in FIGS. 3 and 4, the frame member 21 is a frame body (rectangular tube shape) connected with a lower part of the insulator 30. In other words, the frame member 21 is integrated with the insulator 30. As illustrated in FIG. 3, the frame member 21 includes a recessed part 21e to which an upper end part 22u of the outer tubular member 22 to be described later is press-fitted.

The outer tubular member 22 is formed in a rectangular tube shape corresponding to the frame member 21 and combined to the frame member 21 from below. The outer tubular member 22 holds inside the partition member 40 (see FIGS. 4 and 5).

As illustrated in FIG. 4, the upper end part 22u of the outer tubular member 22 has a flange shape and contacts a lower surface of the frame member 21 and the extension part 30b of the insulator 30. As illustrated in FIG. 5, the upper end part 22u of the outer tubular member extends inward in a substantially L shape (uncus shape) at upper parts on two parallel side surfaces (right and left side surfaces). The upper end part 22u in the substantially L shape is press-fitted to the recessed part 21e (see FIGS. 3 and 4) of the frame member 21.

The second attachment member 20 is not limited to the configuration in which the frame member 21 and the outer tubular member 22 are separated bodies, but may be formed as an integrated component.

When the second attachment member 20 is fixed to the bracket 50 by press-fitting, a front part of the frame member 21 presses an inner surface of the recessed part 51c provided on the front wall part 51 of the bracket 50 to be described later, and a back part of the frame member 21 presses an inner surface of the recessed part 52c provided on the back wall part 52 as illustrated in FIGS. 1 and 2.

Locking Part

The outer tubular member 22 of the second attachment member 20 includes the pair of locking parts 25 as illustrated in FIGS. 3 and 4. For example, each locking part 25 is provided on a side surface near a bottom part of the outer tubular member 22. Specifically, as illustrated in FIGS. 3 to 5, the pair of locking parts 25 are integrally provided on a front surface 22f and a back surface 22g (only the back surface 22g side is illustrated in FIG. 5) as front and back outer surfaces of the outer tubular member 22. As illustrated in FIGS. 3 and 4, the pair of locking parts 25 is formed in shapes symmetric in the front-back direction.

Each locking part 25 includes an arm part 26 and a hook part 27. The arm part 26 extends in the right-left direction. A right end part of the arm part 26 of the front locking part 25 is connected with a left part of the front surface 22f through a support part 26a (see FIG. 4). As illustrated in FIGS. 3 and 5, a right end part of the arm part 26 of the back locking part 25 is connected with a left part of the back surface 22g through the support part 26a.

A left end part of the arm part 26 of each locking part is a free end elastically deformable in the up-down direction.

In this manner, the arm part 26 of each locking part 25 extends in a direction extending from the right side to the left side of the second attachment member 20, in other words, a direction opposite to the press-fitting direction (direction illustrated with the white arrow in FIG. 1) in which the anti-vibration device body 1 is press-fitted to the bracket 50 to be described later. In other words, the anti-vibration device body 1 is moved relative to the bracket 50 from the left side to the right side when press-fitted, and the arm part 26 extends from the right side to the left side as a direction opposite to the moving direction at the press-fitting.

As described above, the left end part of the arm part 26 is elastically deformable in the up-down direction, but is hard to elastically deform (compression deformation) in the press-fitting direction and the direction opposite to the press-fitting direction.

The hook part 27 of each locking part 25 is formed at the left end part of the arm part 26 as an end part in the direction in which the arm part 26 extends. The hook part 27 protrudes downward, and includes a left surface (leading surface) 27a formed orthogonal to the axis line of the arm part 26 and flat in the up-down direction, and a tilted surface 27b downward from the arm part 26 side toward a lower part of the left surface 27a.

As illustrated in FIGS. 1 and 2, the hook part 27 on the front side is locked to the corresponding locking hole 56 provided at a bottom part 51b of the front wall part 51 of the bracket 50 to be described later. The hook part 27 on the back side is locked to the corresponding locking hole 56 provided at a bottom part 52b of the back wall part 52 of the bracket 50 to be described later. In this manner, the press-fitting of the anti-vibration device body 1 to the bracket 50 is completed when each hook part 27 is locked to the corresponding locking hole 56.

When locked to the corresponding locking hole 56 at press-fitting of the anti-vibration device body 1 to the bracket 50, each hook part 27 restricts movement of the anti-vibration device body 1 in the direction opposite to the press-fitting direction (Direction illustrated with the white arrow in FIG. 1). The direction opposite to the press-fitting direction is a direction in which the anti-vibration device body 1 comes off the bracket 50.

As illustrated in FIGS. 4 and 5, the diaphragm 3 is formed to be thin, and the sub liquid chamber 36 is formed between the diaphragm 3 and the partition member 40.

Bracket

As illustrated in FIGS. 1 and 2, the bracket 50 has a substantially gate shape, and includes the front wall part 51, and the back wall part 52, a top wall part 53, a right wall part 54, and flange parts 55. The anti-vibration device body 1 is press-fitted from the left side to a housing unit 50A surrounded by the front wall part 51, the back wall part 52, the top wall part 53, and the right wall part 54 and opened on the left side surface (is press-fitted in the direction illustrated with the white arrow in FIG. 1). As illustrated in FIG. 2, when the anti-vibration device body 1 is press-fitted to the bracket 50, the first attachment member 10 and the insulator 30 covering the first attachment member 10 are substantially entirely disposed inside the front wall part 51, the back wall part 52, the top wall part 53, and the right wall part 54 with predetermined gaps therebetween.

The front wall part 51 and the back wall part 52 face each other in the front-back direction and have shapes symmetric in the front-back direction. The front wall part 51 is disposed on the front surface side of the anti-vibration device body 1. The front wall part 51 includes a front wall body part 51a standing upward, and the bottom part 51b formed as a protrusion toward the back side from a lower end part of the front wall body part 51a.

The front wall body part 51a includes the recessed part 51c near the bottom part 51b. The recessed part 51c is concave toward the front side. The frame member 21 and the outer tubular member 22 on the front part side of the second attachment member 20 are press-fitted to an inner surface (back surface) of the recessed part 51c while being assembled with each other. The inner surface of the recessed part 51c is pressed by a front surface of the frame member 21.

As illustrated in FIG. 2, the bottom part 51b has a flange shape. An inner surface (upper surface) of the bottom part 51b is pressed by a front lower surface of the outer tubular member 22 of the second attachment member 20 press-fitted to the recessed part 51c. The bottom part 51b includes the locking hole 56 as the part to be locked. The locking hole 56 will be described later in detail.

As illustrated in FIGS. 1 and 2, the back wall part 52 is disposed on the back surface side of the anti-vibration device body 1. Similarly to the front wall part 51, the back wall part 52 includes a back wall body part 52a standing upward, and the bottom part 52b formed as a protrusion from a lower end part of the back wall body part 52a toward the front side.

The back wall body part 52a includes the recessed part 52c near the bottom part 52b. The recessed part 52c is concave toward the back side, which is opposite to the recessed part 51c of the front wall body part 51a described above. The frame member 21 and the outer tubular member 22 on the back part side of the second attachment member 20 are press-fitted to an inner surface (front surface) of the recessed part 52c while being assembled with each other. The inner surface of the recessed part 52c contacts a back surface of the frame member 21.

As illustrated in FIG. 2, the bottom part 52b has a flange shape. The inner surface (upper surface) of the bottom part 52b is pressed by a back lower surface of the outer tubular member 22 of the second attachment member 20 press-fitted to the recessed part 52c. The bottom part 52b includes the locking hole 56 as the part to be locked. The locking hole 56 will be described later in detail.

As illustrated in FIG. 1, the top wall part 53 is disposed on the upper surface side of the anti-vibration device body 1. The top wall part 53 is formed continuously with an upper end part of the front wall body part 51a, an upper end part of the back wall body part 52a, and an upper end part of the right wall part 54. An upper flange part 53a protruding obliquely left upward is formed on an upper surface of the top wall part 53. The upper flange part 53a includes a bolt hole 53b for a fixation bolt (not illustrated).

The right wall part 54 is disposed on the right surface side of the anti-vibration device body 1. The right wall part 54 is formed continuously with a right end part of the front wall body part 51a, a right end part of the back wall body part 52a, and a right end part of the top wall part 53. The right side of the right wall part 54 is integrally provided with a side part bracket 54a continuous from the right wall part 54. Front and back lower parts of the side part bracket 54a are provided with flange parts 54b (only the back side is illustrated) for fixation to the vehicle body. Each flange part 54b includes an insertion hole 54c to which a fixation bolt (not illustrated) is inserted.

The flange parts 55 are provided at a lower part of the front wall part 51 and a lower part of the back wall part 52. Each flange part 55 includes an insertion hole 55a to which a fixation bolt (not illustrated) is inserted.

Locking Hole

As illustrated in FIG. 2, the locking holes 56 are formed at the bottom part 51b of the front wall part 51 and the bottom part 52b of the back wall part 52. The locking hole 56 of the bottom part 51b on the front side corresponds to the locking part 25 of the second attachment member 20 on the front side. Similarly, the locking hole 56 of the bottom part 52b on the back side corresponds to the locking part 25 of the second attachment member 20 on the back side. The hook part 27 of each locking part 25 is locked to the corresponding locking hole 56 at press-fitting of the anti-vibration device body 1 to the bracket 50.

Figure 6A:
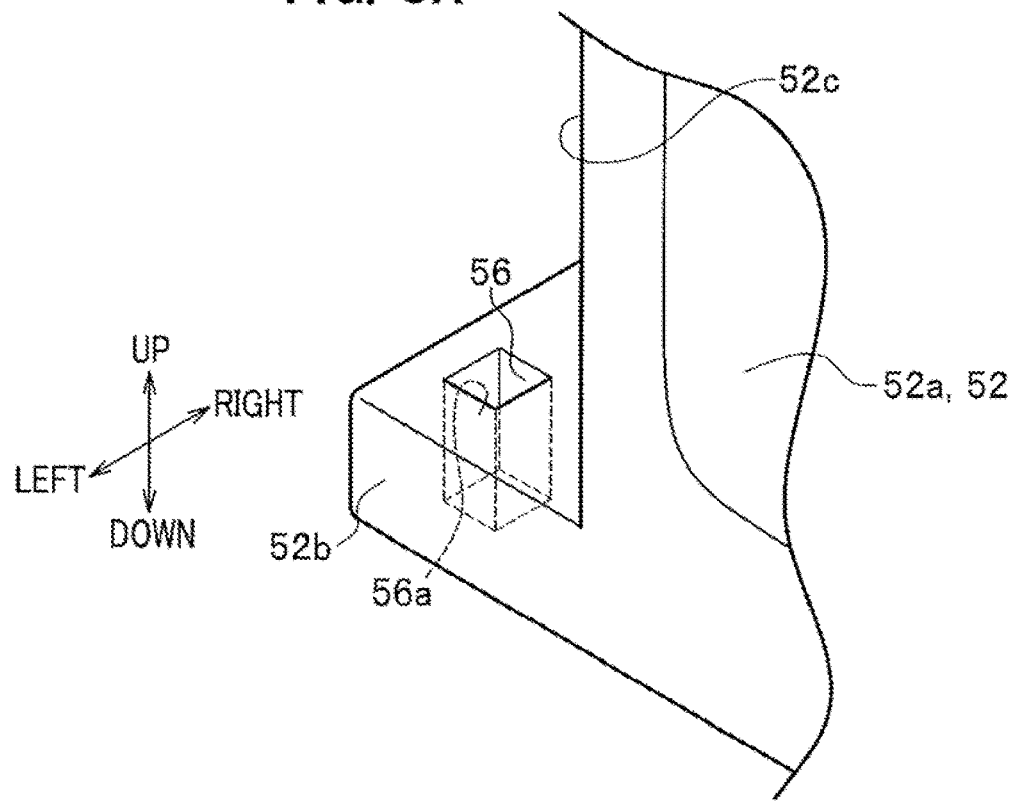
FIG. 6A is a partially enlarged perspective view illustrating a locking hole of a bracket.

Since each locking hole 56 has the same configuration, the locking hole 56 on the back side is exemplarily described with reference to FIGS. 6A and 6B. The locking hole 56 is formed in a substantially rectangular shape in planar view (see FIG. 6A). The locking hole 56 is illustrated as a through-hole but may be a bottomed hole.

Figure 6B:
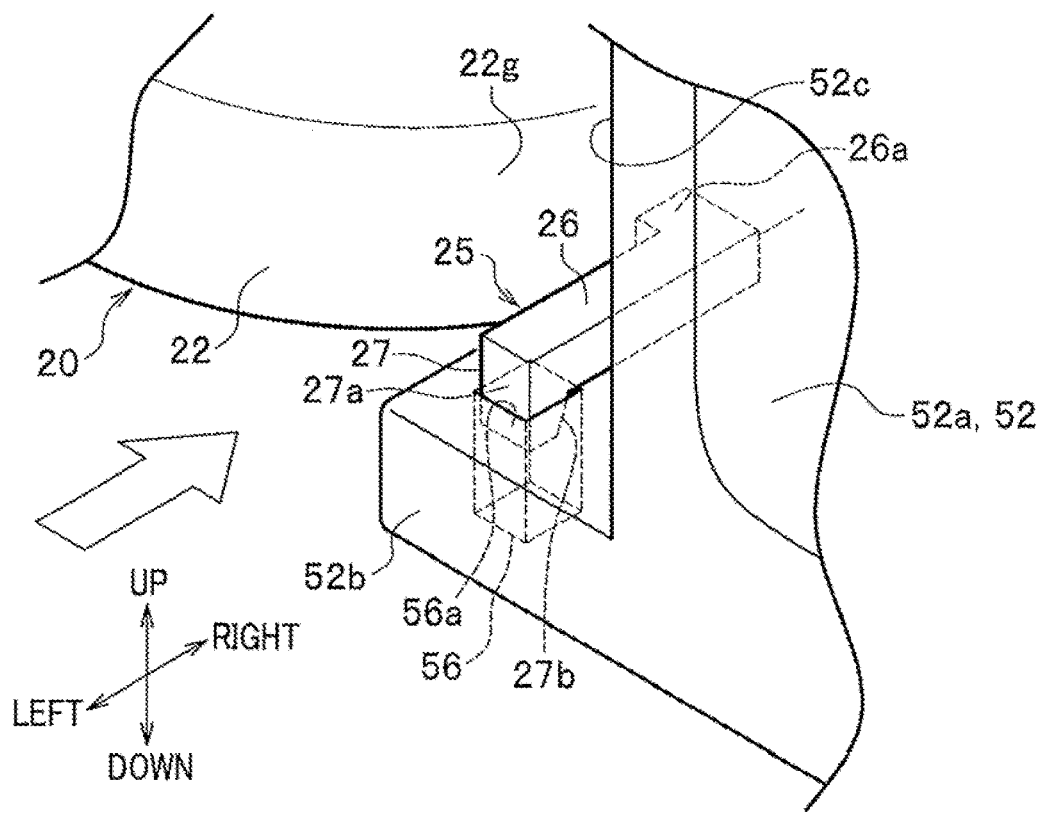
FIG. 6B is a partially enlarged perspective view illustrating a state in which a locking part of the anti-vibration device body is locked to the locking hole.

As illustrated in FIG. 6B, the locking hole 56 includes a left inner side surface 56a facing the left surface 27a of the hook part 27 of the locking part 25 described above. The left surface 27a of the hook part 27 contacts the left inner side surface 56a of the locking hole 56 when the hook part 27 is locked to the locking hole 56 at press-fitting of the anti-vibration device body 1 to the bracket 50.

Effects of Locking Part

The following describes effects of the locking parts 25 when the anti-vibration device body 1 is press-fitted to the bracket 50. The effects of each locking part 25 are same, and thus the locking part 25 on the back side will be exemplarily described for the purpose of illustration.

The anti-vibration device body 1 is press-fitted in the housing unit 50A from the left side of the bracket 50. In this case, in the anti-vibration device body 1, the front part side of the second attachment member 20 (the frame member 21 and the outer tubular member 22) is press-fitted to the recessed part 51c of the front wall part 51, and similarly, the back part side of the second attachment member 20 is press-fitted to the recessed part 52c of the back wall part 52 (see FIG. 2).

Figure 7A:
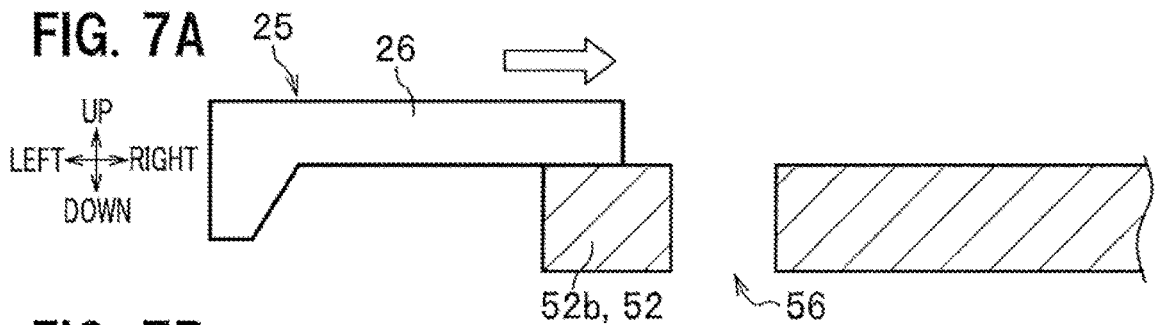
FIG. 7A is an explanatory diagram illustrating a locking situation of the locking part.
Figure 7B:
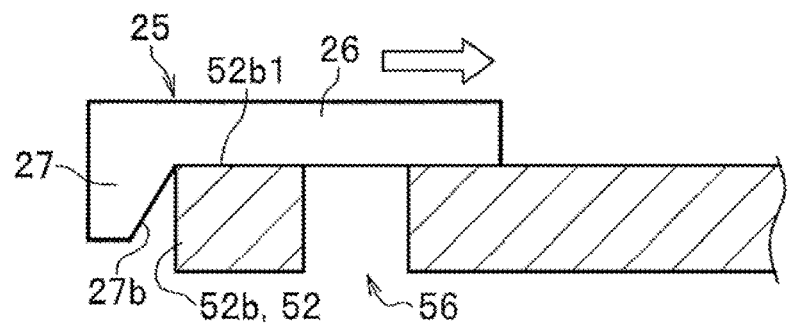
FIG. 7B is an explanatory diagram illustrating the locking situation of the locking part.
Figure 7C:
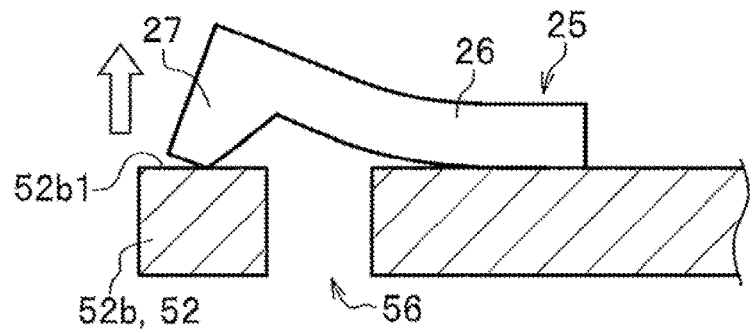
FIG. 7C is an explanatory diagram illustrating the locking situation of the locking part.

At the press-fitting, as illustrated in FIG. 7A, the locking part 25 moves in the press-fitting direction (the direction of a white arrow in FIG. 7A) as the arm part 26 is guided on the upper surface of the bottom part 52b. As the locking part 25 moves in the press-fitting direction, the tilted surface 27b of the hook part 27 contacts the leading end part (left end part) of the bottom part 52b as illustrated in FIG. 7B. Accordingly, the arm part 26 of the locking part 25 elastically deforms upward along the tilted surface 27b of the hook part 27 so that the hook part 27 mounts on a left side upper surface 52b1 of the bottom part 52b as illustrated in FIG. 7C.

Figure 7D:
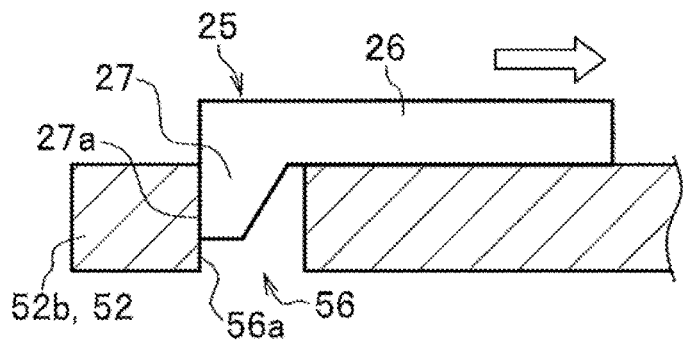
FIG. 7D is an explanatory diagram illustrating the locking situation of the locking part.

Thereafter, as illustrated in FIG. 7D, when the hook part 27 passes the left side upper surface 52b1 of the bottom part 52b and moves to the locking hole 56, the arm part 26 of the locking part 25 elasticity returns so that the hook part 27 is inserted and locked in the locking hole 56. In this state, the left surface 27a of the hook part 27 contacts the left inner side surface 56a of the locking hole 56.

In this manner, when the anti-vibration device body 1 is press-fitted to a position at which the hook part 27 is locked to the locking hole 56, the press-fitting of the anti-vibration device body 1 to the bracket 50 ends. Thus, the anti-vibration device body 1 is assembled to the bracket 50 by the press-fitting.

The positional relation between the hook part 27 and the locking hole 56 is set so that the hook part 27 is locked to the locking hole 56 when the press-fitting is performed until a right end part of the frame member 21 contacts a predetermined position on the right wall part 54. Instead of this setting, the positional relation between the hook part 27 and the locking hole 56 may be set so that the hook part 27 is locked to the locking hole 56 (the press-fitting ends) before the position at which the right end part of the frame member 21 contacts the right wall part 54.

Figure 7E:
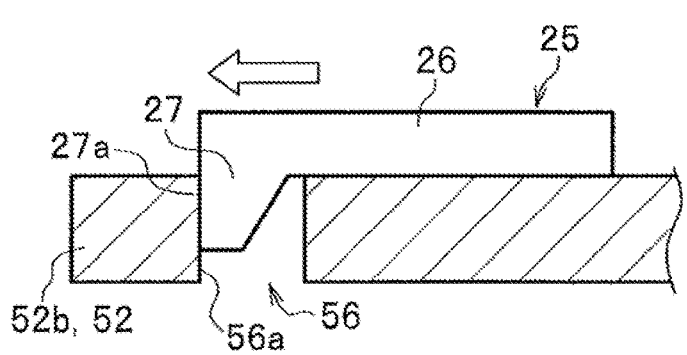
FIG. 7E is an explanatory diagram illustrating the locking situation of the locking part.

After the press-fitting ends, when external force or the like acts on the anti-vibration device body 1 in a direction (coming-off direction) of coming off the bracket 50, movement of the anti-vibration device body 1 in the coming-off direction is restricted by the contact of the left surface 27a of the hook part 27 with the left inner side surface 56a of the locking hole 56 as illustrated in FIG. 7E.

In this case, the arm part 26 of the locking part 25 presses in the axial direction against compression force due to movement in the coming-off direction. Accordingly, movement of the anti-vibration device body 1 in the coming-off direction is excellently restricted, and concentration of shear stress on the hook part 27 in the coming-off direction is excellently prevented. Thus, the hook part 27 is not potentially damaged. In addition, the left surface 27a of the hook part 27 and the left inner side surface 56a of the locking hole 56 are in surface contact with each other. Thus, stress can be stably received on the left inner side surface 56a of the locking hole 56 when external force or the like acts on the anti-vibration device body 1 in the coming-off direction. Accordingly, movement of the anti-vibration device body 1 in the coming-off direction can be excellently restricted.

In the anti-vibration device according to the present embodiment described above, when the anti-vibration device body 1 is press-fitted to the bracket 50, the hook part 27 of each locking part 25 of the anti-vibration device body 1 is locked to the corresponding locking hole 56 of the bracket 50, which completes the press-fitting. The arm part 26 of the locking part 25 extends in the direction opposite to the press-fitting direction in which the anti-vibration device body 1 is press-fitted to the bracket 50, and is provided with the hook part 27 at the end part in the extended direction. Thus, after locking, the arm part 26 struts against movement of the anti-vibration device body 1 in the coming-off direction. Accordingly, the movement of the anti-vibration device body 1 in the coming-off direction is directly restricted by the locking part, and disposition (fixation) of the anti-vibration device body 1 onto the bracket 50 is excellently maintained.

Moreover, since each locking part 25 is provided on the second attachment member 20 of the anti-vibration device body 1 and each locking hole 56 is provided on the bracket 50, the locking part 25 and the locking hole 56 can be easily formed. Accordingly, the freedom of formation of the locking part 25 and the locking hole 56 is high. Further, since the part to be locked is achieved by the locking hole 56, the part to be locked can be more easily formed.

Moreover, since the second attachment member 20 is made of synthesis resin, each locking parts 25 can be formed integrally with the second attachment member 20 (outer tubular member 22), which facilitates the formation of the locking parts 25. In addition, the locking parts 25 can easily have elasticity, which leads to improvement of assembly easiness.

Furthermore, since the second attachment member 20 is made of the two members of the frame member 21 and the outer tubular member 22 and the locking parts 25 are provided on the outer tubular member 22 as one of the two members, shaping easiness and assembly easiness can be improved.

Second Embodiment

Figure 9:
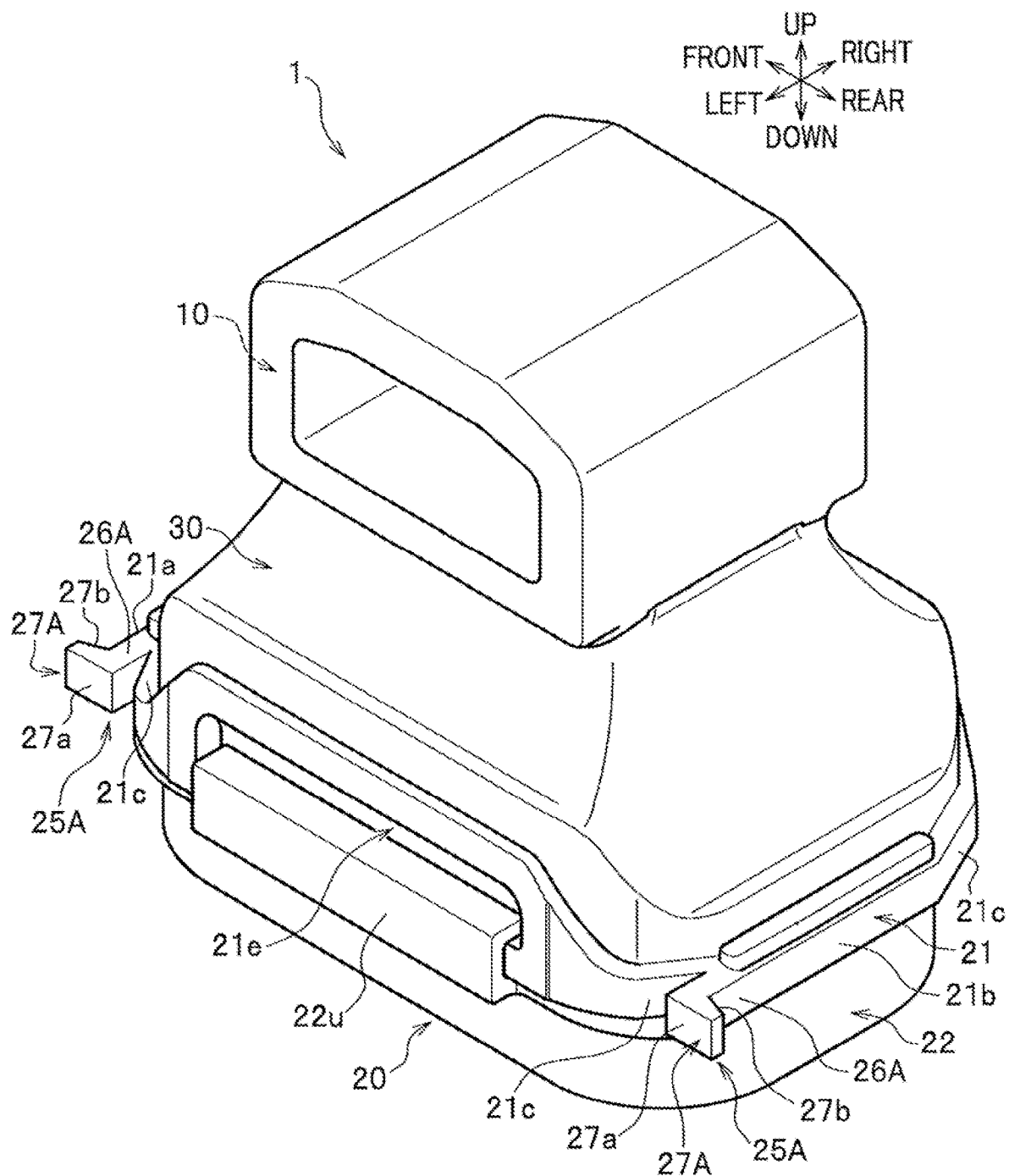
FIG. 9 is a perspective view illustrating the anti-vibration device body according to the second embodiment.

The following describes an anti-vibration device according to a second embodiment of the present invention with reference to FIGS. 8 and 9. The present embodiment is different from the first embodiment in that the frame member 21 of the second attachment member 20 is provided with a pair of locking parts 25A.

Locking Part

As illustrated in FIG. 9, the pair of locking parts 25A are integrated with a front surface 21a and a back surface 21b as front and back outer surfaces of the frame member 21. The pair of locking parts 25A are formed in shapes symmetric in the front-back direction.

Similarly to the first embodiment, each locking part 25A includes an arm part 26A extending in the right-left direction, and a hook part 27A provided at a left end part of the arm part 26A. In the locking part 25A on the front side, a right end part of the arm part 26A is connected with a left part of the front surface 21a. In the back side locking part 25A, a right end part of the arm part 26A is connected with a left part of the back surface 21b. In each locking part 25A, the left end part of the arm part 26A is a free end elastically deformable in the front-back direction unlike that described in the first embodiment. As described above, the left end part of the arm part 26A is elastically deformable in the front-back direction, but is hard to elastically deform (compression deformation) in the press-fitting direction and the direction opposite to the press-fitting direction.

The hook part 27A of the locking part 25A on the front side protrudes toward the front side. As illustrated in FIGS. 8 and 9, the hook part 27A on the front side is locked to a locking hole 56A provided on a protrusion part 51d of the front wall part 51 of the bracket 50 to be described later. The hook part 27A of the locking part 25A on the back side protrudes toward the back side. The hook part 27A on the back side is locked to a locking hole 56A provided on a protrusion part 52d of the back wall part 52 of the bracket 50 to be described later. Press-fitting of the anti-vibration device body 1 to the bracket 50 is completed when each hook part 27A is locked to the corresponding locking hole 56A.

When locked to the corresponding locking hole 56A at press-fitting of the anti-vibration device body 1 to the bracket 50, each hook part 27A restricts movement of the anti-vibration device body 1 in the direction opposite to the press-fitting direction (direction illustrated with a white arrow in FIG. 8).

Each corner 21c (three corners 21c are illustrated in FIG. 9) of the frame member 21 is formed straight (non-round shape). The locking part 25A on the front side is disposed on the front side of the left corner 21c with a gap formed between the locking part 25A and the front left corner 21c. The locking part 25A on the back side is disposed on the back side of the left corner 21c with a gap formed between the locking part 25A and the back left corner 21c. Each locking part 25A can elastically deform in the front-back direction through the above-described gap.

Bracket

As illustrated in FIG. 8, in the bracket 50 according to the second embodiment, the locking holes 56A are provided on the front and back wall parts 51 and 52. The front wall part 51 and the back wall part 52 face each other in the front-back direction, and have shapes symmetric in the front-back direction.

The front wall body part 51a of the front wall part 51 includes the protrusion part 51d protruding on the left side of the recessed part 51c. The protrusion part 51d has a substantially trapezoid shape. The protrusion part 51d includes the vertically long locking hole 56A as the part to be locked. The locking hole 56A will be described later in detail.

Similarly to the front wall body part 51a, the back wall body part 52a of the back wall part 52 includes the protrusion part 52d protruding on the left side of the recessed part 52c. The protrusion part 51d includes the vertically long locking hole 56A as the part to be locked.

Locking Hole

As illustrated in FIG. 8, the locking holes 56A are formed at the protrusion part 51d of the front wall part 51 and the protrusion part 52d of the back wall part 52. The locking hole 56A of the protrusion part 51d on the front side corresponds to the locking part 25A of the second attachment member 20 on the front side. Similarly, the locking hole 56A of the protrusion part 52d on the back side corresponds to the locking part 25A of the second attachment member 20 on the back side. The hook part 27A of each locking part 25A is locked to the corresponding locking hole 56A at press-fitting of the anti-vibration device body 1 to the bracket 50.

Since each locking hole 56A has the same configuration, the locking hole 56A on the back side is exemplarily described. The locking hole 56A is formed in a substantially vertically rectangular shape in back view (see FIG. 8). The locking hole 56A is illustrated as a through-hole but may be a bottomed hole to which the hook part 27A can be locked.

The locking hole 56A includes a left inner side surface 56a1 facing the left surface 27a of the hook part 27A of the locking part 25A described above. The left surface 27a of the hook part 27A contacts the left inner side surface 56a1 of the locking hole 56A when the hook part 27A is locked to the locking hole 56A at press-fitting of the anti-vibration device body 1 to the bracket 50.

Effects of Locking Part

Similarly to the first embodiment, the anti-vibration device body 1 is press-fitted in the housing unit 50A from the left side of the bracket 50. In this case, too, in the anti-vibration device body 1, the front part side of the second attachment member 20 (the frame member 21 and the outer tubular member 22) is press-fitted to the recessed part 51c of the front wall part 51, and the back part side of the second attachment member 20 is press-fitted to the recessed part 52c of the back wall part 52.

At the press-fitting, the locking part 25A moves in the press-fitting direction (direction of the white arrow in FIG. 8) as the arm part 26A is guided on the inner surface (front surface) of the protrusion part 52d. As the locking part 25A moves in the press-fitting direction, the tilted surface 27b of the hook part 27A contacts the leading end part (left end part) of the protrusion part 52d. Accordingly, the arm part 26A of the locking part 25A elastically deforms forward along the tilted surface 27b (see FIG. 9) of the hook part 27A so that the hook part 27A is mounted on the inner surface (front surface) of the protrusion part 52d.

Thereafter, when the hook part 27A moves to the locking hole 56A, the arm part 26A of the locking part 25A elasticity returns so that the hook part 27A is inserted and locked in to the locking hole 56A. In this state, the left surface 27a of the hook part 27A contacts the left inner side surface 56a1 of the locking hole 56A.

In this manner, when the anti-vibration device body 1 is press-fitted to a position at which the hook part 27A is locked to the locking hole 56A, the press-fitting of the anti-vibration device body 1 to the bracket 50 ends.

After the end of the press-fitting, when external force or the like acts on the anti-vibration device body 1 in the direction (coming-off direction) of coming off the bracket 50, movement of the anti-vibration device body 1 in the coming-off direction is restricted by the contact of the left surface 27a of the hook part 27A with the left inner side surface 56a1 of the locking hole 56A.

The anti-vibration device according to the present embodiment described above can achieve effects similarly to the effects described in the first embodiment. Specifically, since the arm part 26A of each locking part 25A extends in the direction opposite to the press-fitting direction in which the anti-vibration device body 1 is press-fitted to the bracket 50, the arm part 26A struts against movement of the anti-vibration device body 1 in the coming-off direction after locking. Accordingly, the movement of the anti-vibration device body 1 in the coming-off direction is directly restricted by contact of the locking part 25A, and fixation of the anti-vibration device body 1 to the bracket 50 is excellently maintained.

The hook part 27A of each locking part 25A can be formed larger than that in the first embodiment by using the space in the up-down direction. In addition, in the present embodiment, since locking is performed by the locking parts 25A provided on the frame member 21 close to the first attachment member 10, movement of the anti-vibration device body 1 in the coming-off direction is more effectively restricted as compared to the first embodiment.

Since each locking part 25A is provided on the frame member 21 of the second attachment member 20 and each locking hole 56A is provided on the bracket 50, the locking part 25A and the locking hole 56A can be easily formed. In addition, the freedom of formation of the locking part 25A and the locking hole 56A is high.

Since the second attachment member 20 is made of synthesis resin, each locking part 25A can be formed integrally with the frame member 210 of the second attachment member 20, which facilitates the formation of the locking part 25A. In addition, the locking part 25A can easily have elasticity, which leads to excellent assembly easiness.

Third Embodiment

Figure 10:
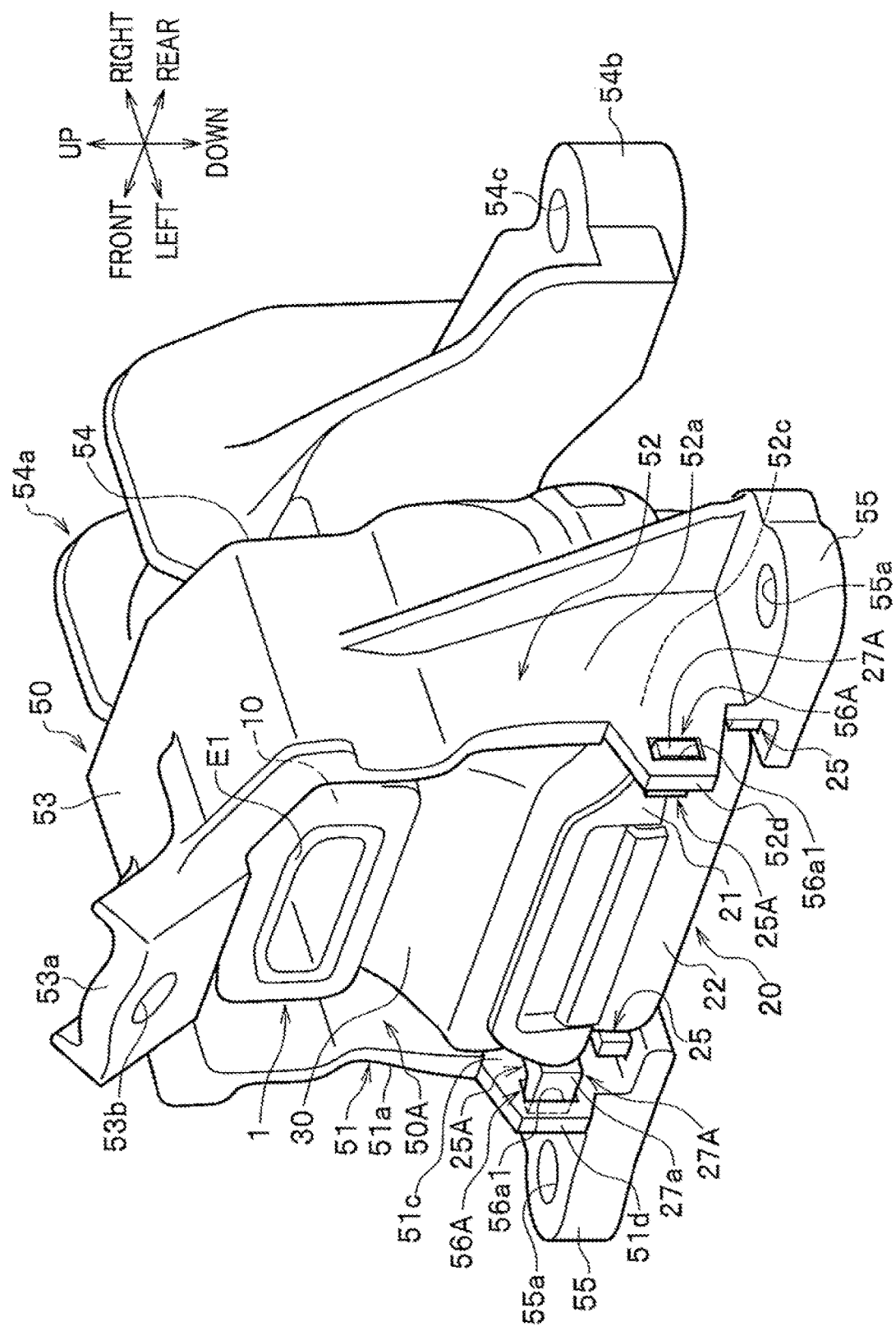
FIG. 10 is a perspective view illustrating an anti-vibration device according to a third embodiment of the present invention.
Figure 11:
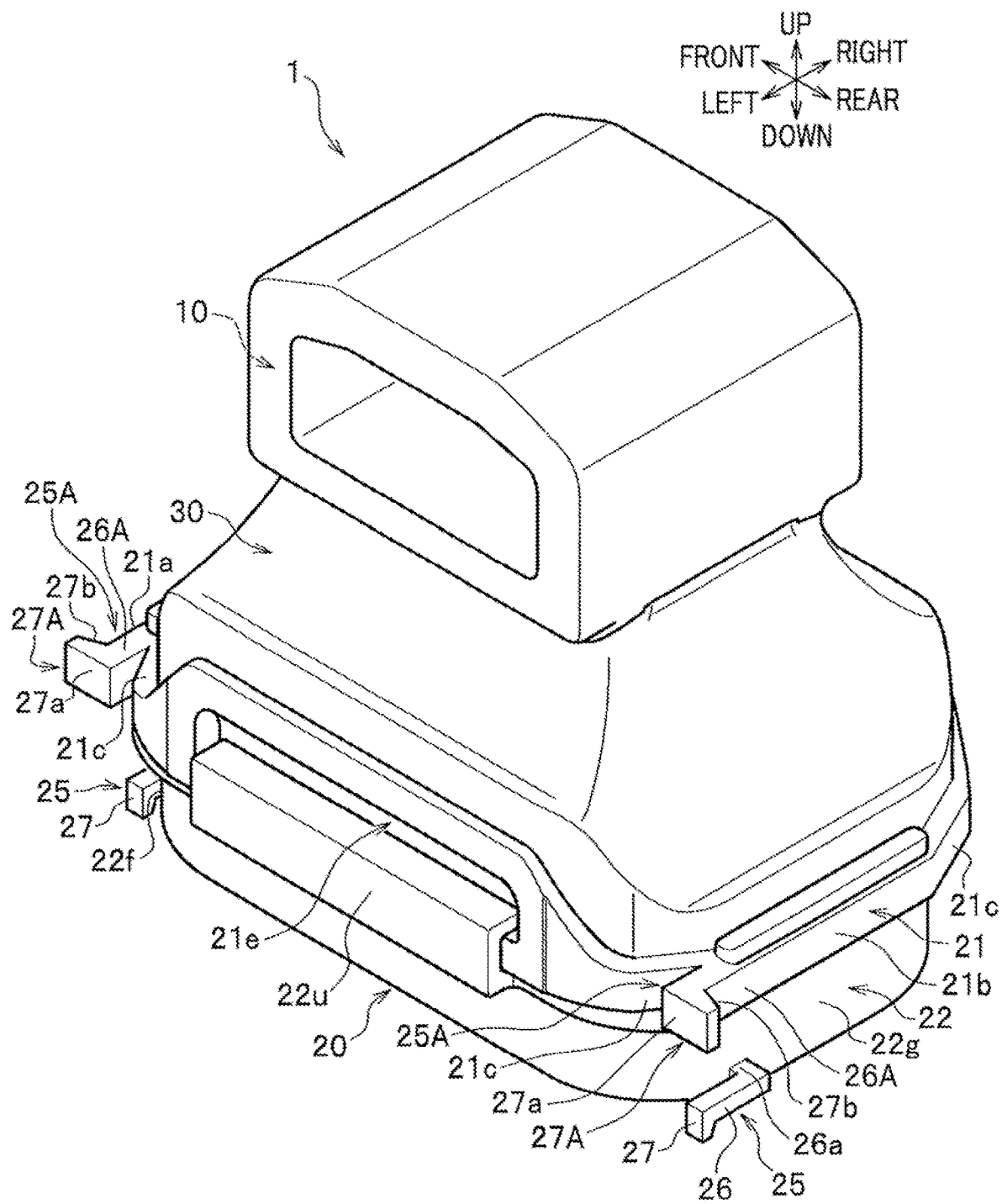
FIG. 11 is a perspective view illustrating the anti-vibration device body according to the third embodiment.

The following describes an anti-vibration device according to a third embodiment of the present invention with reference to FIGS. 10 and 11. In the present embodiment, the second attachment member 20 of the anti-vibration device body 1 is provided with the locking parts 25 described in the first embodiment and the locking parts 25A described in the second embodiment.

Locking Part

As illustrated in FIG. 11, the second attachment member 20 of the anti-vibration device body 1 includes the pair of locking parts 25 and the pair of locking parts 25A. Similarly to the first embodiment, the pair of locking parts 25 are integrated with the front surface 22f and the back surface 22g as front and back outer surfaces of the outer tubular member 22. Similarly to the second embodiment, the locking parts 25A are integrated with the front surface 21a and the back surface 21b as front and back outer surfaces of the frame member 21.

Locking Hole

The bracket 50 includes the locking holes 56 to which the pair of locking parts 25 are locked, and the locking holes 56A to which the pair of locking parts 25A are locked. Similarly to the first embodiment, the locking holes 56 are provided on the bottom part 51b of the front wall part 51 and the bottom part 52b of the back wall part 52. Similarly to the second embodiment, the locking holes 56A are provided on the protrusion part 51d of the front wall part 51 and the protrusion part 52d of the back wall part 52.

In this manner, the press-fitting of the anti-vibration device according to the present embodiment is completed when the two locking parts 25 and 25A vertically provided on each of the front and back outer surfaces of the anti-vibration device body 1 are locked to the locking holes 56 and 56A of the bracket 50, respectively.

In the anti-vibration device according to the present embodiment described above, the movement of the anti-vibration device body 1 in the coming-off direction is directly restricted by contact of the two locking parts 25 and 25A vertically provided on each of the front and back outer surfaces of the anti-vibration device body 1 with the locking holes 56 and 56A. Accordingly, fixation of the anti-vibration device body 1 to the bracket 50 is more excellently maintained, and the anti-vibration device body 1 is highly reliably prevented from coming off.

The embodiments of the present invention are described above, but the present invention is not limited to the above-described embodiments, but may be modified in various manners.

For example, the parts to be locked are not limited to the above-described locking holes 56 and 56A, but may be any parts to which the hook parts 27 and 27A of the locking parts 25 and 25A are locked.

The shape of the locking hole 56 may be, for example, circular.

In the first embodiment, each locking part 25 is formed integrally with the outer tubular member 22, but may be separately formed and attached to the outer tubular member 22. The locking part 25 may be formed on the frame member 21.

In the second and third embodiments, each locking part 25A is formed integrally with the frame member 21, but may be separately formed and attached to the frame member 21.

The locking part 25A may be formed on the outer tubular member 22.

In the first to third embodiments, the second attachment member 20 may be made of metal, and the locking parts 25 and 25A may be made of metal.

In the first embodiment, a plurality of locking parts 25 may be provided. In this case, a plurality of locking holes 56 (parts to be locked) are provided for the respective locking parts 25. Similarly, in the second and third embodiments, a plurality of locking parts 25A may be provided. In this case, a plurality of locking holes 56A (parts to be locked) are provided for the respective locking parts 25A.

In the first to third embodiments, the locking parts 25 and 25A are provided near the opening of the housing unit 50A, but not limited thereto, and may be provided on the right back side of the housing unit 50A.

In the first embodiment, the locking parts 25 may protrude on the left side from the housing unit 50A by using a space (e.g., space in the engine room of the automobile) on a side of the opening of the housing unit 50A (the left side of the bracket 50). In this case, the bottom parts 51b and 52b may be extended and provided with the locking holes 56 (parts to be locked) corresponding to the locking parts 25 protruding on the left side from the housing unit 50A.

The bracket 50 may include at least the facing front and back wall parts 51 and 52 between which the anti-vibration device body 1 is fixed by press-fitting.

The present invention is not limited to a vehicle including an engine as a vibration source, but is widely applicable to a vehicle including a motor as a vibration source.

REFERENCE SIGNS LIST

1 Anti-vibration device body
10 First attachment member
20 Second attachment member
25 Locking part
25A Locking part
26, 26A Arm part
27, 27A Hook part
30 Insulator
50 Bracket
51 Front wall part (Wall part)
52 Back wall part (Wall part)
56, 56A Locking hole

The invention claimed is:

1. An anti-vibration device comprising:
an anti-vibration device body in which an insulator is interposed between a first attachment member and a second attachment member, the first attachment member, the second attachment member, and the insulator being integrated together; and
a bracket including front and back wall parts facing each other in a front-back direction, between which the anti-vibration device body is press-fitted in a right-left direction orthogonal to the front-back direction and an up-down direction and fixed via the second attachment member, wherein
the second attachment member includes a frame member, and an outer tubular member fixed to the frame member,
at least one of the outer tubular member and the frame member of the second attachment member is provided with a pair of front and back locking parts that are locked to the front and back wall parts to restrict movement of the anti-vibration device body in a direction opposite to a press-fitting direction in which the anti-vibration device body is press-fitted to the bracket,
bottom flange parts are provided at lower end parts of the front and back wall parts of the bracket,
a lower surface of the outer tubular member and each of the bottom flange parts contact each other in the up-down direction in a state in which the anti-vibration device body is press-fitted and fixed in the bracket, and
each of the pair of front and back locking parts includes an arm part provided on front and back outer surfaces of the outer tubular member or on front and back outer surfaces of the frame member and extending in the direction opposite to the press-fitting direction, and a hook part provided at an end part of the arm part in a direction in which the arm part extends and locked to a part to be locked provided on each of the bottom flange parts or on each of the front and back wall parts.

2. The anti-vibration device according to claim 1, wherein the part to be locked to which the hook part of each said locking part is locked is a locking hole.

3. The anti-vibration device according to claim 2, wherein
the second attachment member is made of resin, and
the locking parts are formed integrally with the second attachment member.

4. The anti-vibration device according to claim 3, wherein the pair of front and back locking parts are provided on each of the frame member and the outer tubular member.

5. The anti-vibration device according to claim 2, wherein the pair of front and back locking parts are provided on each of the frame member and the outer tubular member.

6. The anti-vibration device according to claim 1, wherein the pair of front and back locking parts are provided on each of the frame member and the outer tubular member.

7. The anti-vibration device according to claim 1, wherein the arm part is a cantilever arm in which the end part of the arm part is a free end.

8. The anti-vibration device according to claim 1, wherein
the front and back wall parts of the bracket include a pair of recessed parts facing each other,
the frame member has a width dimension such that the frame member is press-fitted in the pair of recessed parts, and
the outer tubular member has a width dimension smaller than that of the frame member.

9. An anti-vibration device comprising:
an anti-vibration device body including a first attachment member, a second attachment member, and an insulator interposed between the first attachment member and the second attachment member; and
a bracket including a pair of opposite wall parts, between which the anti-vibration device body is press-fitted and fixed via the second attachment member, wherein
the bracket comprises a pair of recessed parts provided on the pair of opposite wall parts, and a pair of bottom flange parts provided at lower end parts of the pair of opposite wall parts,
the second attachment member includes a frame member having a width dimension to be press-fitted in the pair of recessed parts, and an outer tubular member fixed to the frame member,
at least one of the outer tubular member and the frame member of the second attachment member is provided with a pair of locking parts locked to the pair of opposite wall parts to restrict movement of the anti-vibration device body in a direction opposite to a press-fitting direction in which the anti-vibration device body is press-fitted to the bracket,
each of the locking parts includes an arm part provided on outer surfaces of the outer tubular member or on outer surfaces of the frame member and extending in the direction opposite to the press-fitting direction, and a hook part provided at an end part of the arm part in a direction in which the arm part extends and locked to a part to be locked that is provided on each of the pair of bottom flange parts or on each of the pair of opposite wall parts, and
in a state in which the anti-vibration device body is press-fitted and fixed in the bracket, the frame member presses inner surfaces of the pair of recessed parts within a region defined by the pair of recessed parts and upper surfaces of the pair of bottom flange parts, each of the pair of locking parts is locked to the part to be locked within the region, and a lower surface of the outer tubular member contacts the upper surfaces of the pair of bottom flange parts in up-down direction within the region.

10. The anti-vibration device according to claim 9, wherein
the arm part is a cantilever arm in which the end part of the arm part is a free end.

11. The anti-vibration device according to claim 9, wherein
the outer tubular member has a width dimension smaller than that of the frame member.

12. The anti-vibration device according to claim 11, wherein
the pair of locking parts are provided on the outer surfaces of the outer tubular member, and
the part to be locked is a locking hole formed in each of the pair of bottom flange parts of the bracket.

13. The anti-vibration device according to claim 11, wherein
the pair of locking parts are provided respectively on the outer surfaces of the outer tubular member and the outer surfaces of the frame member, and
the part to be locked is a locking hole respectively formed in each of the pair of bottom flange parts and each of the pair of opposite wall parts of the bracket.

14. The anti-vibration device according to claim 9, wherein
the pair of locking parts are provided on the outer surfaces of the frame member, and
the part to be locked is a locking hole formed in each of the pair of opposite wall parts of the bracket.

15. The anti-vibration device according to claim 9, wherein
the second attachment member is made of resin, and
the pair of locking parts are formed integrally with the second attachment member.

* * * * *